United States Patent
Marr

(10) Patent No.: US 7,272,588 B2
(45) Date of Patent: Sep. 18, 2007

(54) SYSTEMS, METHODS, AND COMPUTER-READABLE MEDIA FOR GENERATING SERVICE ORDER COUNT METRICS

(75) Inventor: Gary Marr, Marietta, GA (US)

(73) Assignee: Microsoft Corporation, Redmond, WA (US)

( * ) Notice: Subject to any disclaimer, the term of this patent is extended or adjusted under 35 U.S.C. 154(b) by 387 days.

(21) Appl. No.: 10/999,483

(22) Filed: Nov. 30, 2004

(65) Prior Publication Data

US 2006/0116998 A1    Jun. 1, 2006

(51) Int. Cl.
*G06F 17/30* (2006.01)

(52) U.S. Cl. .................. 707/1; 707/4; 707/6
(58) Field of Classification Search .......... 707/1, 707/4, 6
See application file for complete search history.

(56) References Cited

U.S. PATENT DOCUMENTS

| | | | | |
|---|---|---|---|---|
| 4,975,841 A | * | 12/1990 | Kehnemuyi et al. | 705/32 |
| 6,104,798 A | * | 8/2000 | Lickiss et al. | 379/201.12 |
| 2002/0082816 A1 | * | 6/2002 | Nguyen et al. | 703/13 |
| 2002/0106067 A1 | * | 8/2002 | Sandel et al. | 379/201.03 |
| 2002/0147502 A1 | * | 10/2002 | Price et al. | 700/1 |
| 2002/0161799 A1 | * | 10/2002 | Maguire et al. | 707/503 |
| 2003/0233326 A1 | * | 12/2003 | Manley et al. | 705/42 |
| 2004/0088650 A1 | * | 5/2004 | Killen et al. | 715/503 |
| 2004/0111666 A1 | * | 6/2004 | Hollcraft | 715/503 |

* cited by examiner

*Primary Examiner*—Tim Vo
*Assistant Examiner*—Hasanul Mobin
(74) *Attorney, Agent, or Firm*—Merchant & Gould

(57) ABSTRACT

Systems, methods, and computer-readable media are for generating service order count metrics. A selected subset of all customer order information is extracted from a database table and stored in a summary table and detail table. The information, including text strings associated with communication device identifiers, is extracted for a selected period of time, linked together by order number, and stored in a completions table within a local database. The completions table is searched in cycles according to different search criteria of decreasing order of reliability in order to reconcile the order information in the completions table with the completed order count from the summary table. Once the orders in the completions table are accurate, logic is employed to count the number of communication device identifiers from the text strings corresponding to each order number.

18 Claims, 4 Drawing Sheets

RESULTS TABLE

| Order Number | Application Date | Issue Date | FID | TELEPHONE NUMBER RANGE | Ext. 1 | Ext. 2 | Ext. 3 | Ext. 4 | Lines |
|---|---|---|---|---|---|---|---|---|---|
| C5FT12V6 | 07/17/2004 | 07/17/2004 | TN | 404-123-6000-6500 | 6500 | 6000 | 0 | 0 | 501 |
| C5FT12V6 | 07/17/2004 | 07/17/2004 | TN | 404-123-6501-7000, 7002-7500 | 7000 | 6501 | 7500 | 7002 | 999 |
| C5FT12V6 | 07/17/2004 | 07/17/2004 | TN | 404-123-7501-8000 | 7501 | 8000 | 0 | 0 | 500 |
| C5FT12V7 | 07/17/2004 | 07/21/2004 | TN | 404-456-2000-2001 | 2001 | 2000 | | | 2 |
| TOTAL ORDERS | | | | | | | | | 2002 |

FIG. 4

SYSTEMS, METHODS, AND COMPUTER-READABLE MEDIA FOR GENERATING SERVICE ORDER COUNT METRICS

FIELD OF THE INVENTION

The present invention relates to systems, methods, and computer-readable media for generating service order count metrics. More particularly, the present invention relates to systems, methods and computer-readable media for extracting selected customer order information from all other order information and determining the number of orders for a selected period of time and the number of communication device identifiers associated with the total number of orders for the same time.

BACKGROUND OF THE INVENTION

Companies often track the number of new customers and the number of customers lost during a given time period. An important metric for many companies, particularly those in highly competitive industries such as the telecommunications industry, is the number of customers who have left the company and then returned. It is a goal for most companies to win back the customers who have left to try out the services or product of a competitor. By keeping close track of the number of customers that return to the company and information related to their return, a company can determine the cost associated with winning those customers back and the circumstances surrounding their return, and use this information to make informed strategic business decisions.

Being able to retrieve this information on return customers can be complicated in a large business. For example, a company may receive hundreds of thousands of orders per month for a company's goods or services. A percentage of those orders are from returning customers. The order processing for such a large scale operation is complex, leading to millions of data entries into large databases. The complexity is apparent given that service orders are often assigned different classifications for various reasons, may be held or processed immediately, may be cancelled, and could be duplicated in the system for any number of reasons. It is desirable to accurately determine the number of orders, for goods or services, completed during a given period of time for customers returning to a company from a competitor, for any new customers, or for any selected subset of the overall customer orders for a given time period.

SUMMARY OF THE INVENTION

Embodiments of the present invention address these issues by providing methods, computer-readable media, and systems for generating service order count metrics. According to one embodiment of the present invention, a first table is searched for an indicator that identifies the desired subset of customer order information. This order information is extracted and stored together in a table. Included with this information is a range of communication device identifiers. In the case of a telecommunications company, these identifiers might be telephone numbers. According to one embodiment, the table containing the extracted customer order information is actually two tables, one containing summary type of information with one row per order number, while the other table includes the details of the order and has multiple rows per order number. These tables are searched for the range information associated with the communication device identifiers for a selected period of time. This information, and other information from both summary and detail tables is extracted, linked, and stored together in a table within a local database.

The number of orders in the local table is reconciled with the number of completed orders for the selected time period taken from the summary table in order to clean up any duplications or other discrepancies that may exist in the local table. After reconciliation, the number of communication device identifiers that were ordered during the selected time period can be determined using logic that searches the range information stored with the orders and converts the ranges to numerical values. The difference between these values is determined and summed with all others to determine a total number of communication device identifiers ordered by subset of customers.

These and other features and advantages, which characterize the present invention, will be apparent from a reading of the following detailed description and a review of the associated drawings. It is to be understood that both foregoing general description and the following detailed description are exemplary and explanatory only and are not restrictive of the invention, as claimed.

BRIEF DESCRIPTION OF THE DRAWINGS

FIG. 4 illustrates an example of a Results Table according to one embodiment of the present invention.

DETAILED DESCRIPTION OF THE PREFERRED EMBODIMENT

Knowing how many customers return to a company after leaving for a competitor's goods or services, or how many orders result from any other subset of customers, is valuable information for a company to be able to quantify. By determining an accurate monthly total for the goods or services sold to any subset of customers, several things are learned. First, the company has a measure of their performance in comparison with that of its competitors or in comparison with another business unit within the company. The totals may be used for trend analysis and could be used as a measure of marketing success. Additionally, the revenue from these goods or services sold to returning customers or any other subset may be compared to the overhead and costs associated with marketing and other measures aimed at these customers in order to gauge the value and success of targeting that particular subset. Other valuable insights gained from knowing the quantity of goods and services sold to a subset of customers include the average goods or services sold per order and which customer operating units are producing the highest volume of orders. The following description is written with respect to determining how many telephone lines are ordered in a given period of time by customers who have left the company's services, but are returning. It is to be understood that the systems, methods, and computer-readable media described herein are equally applicable to any other subset of customer or with any other type of business selling any type of goods or services. Additionally, it is to be understood that the terms "telephone number" and "telephone lines" are used interchangeably throughout this description.

Figure 1:
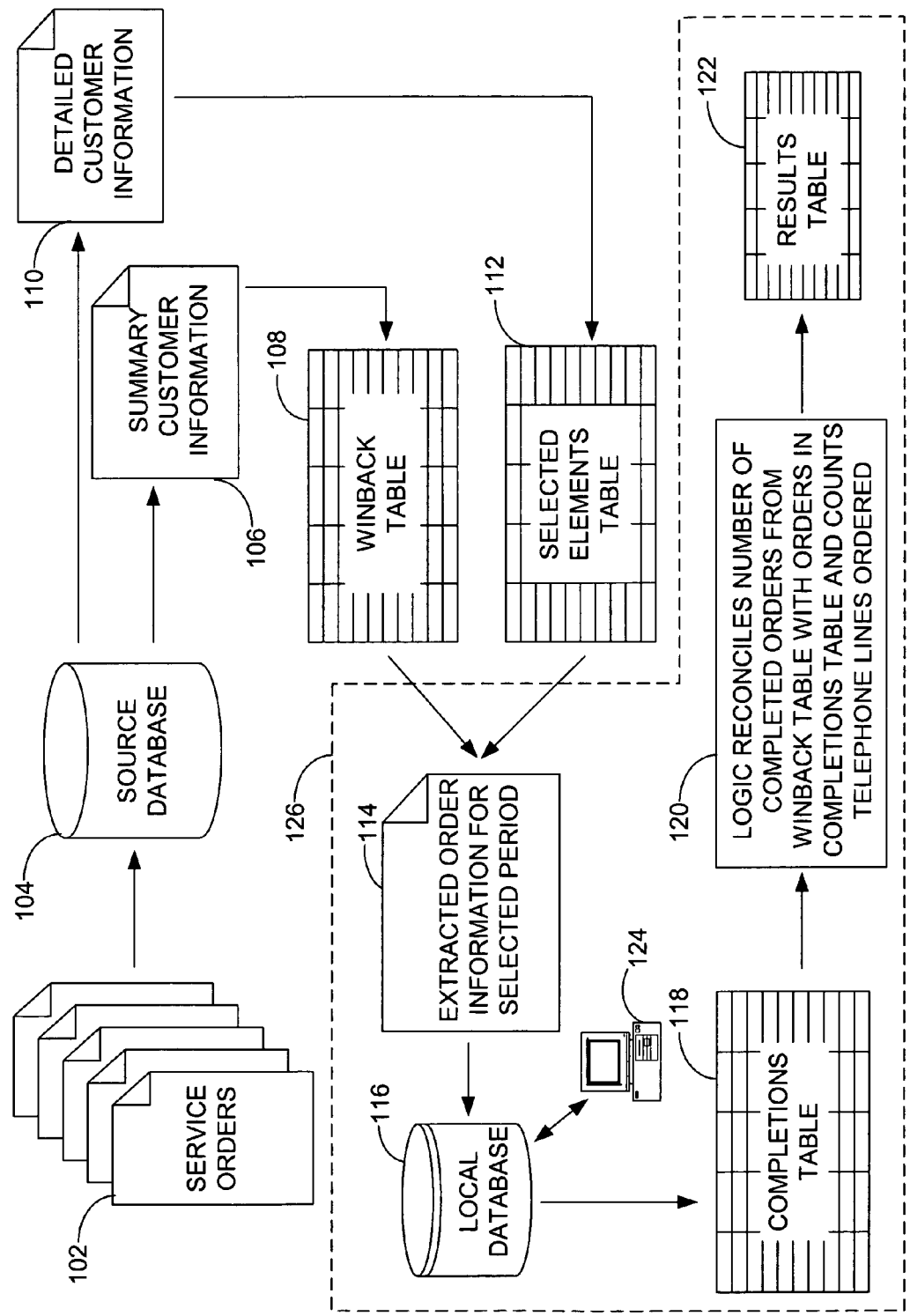
FIG. 1 illustrates a block diagram of an order tracking process according to one embodiment of the present invention.

FIG. 1 illustrates a process according to one aspect of the present invention. A customer first places an order for a product or service. Placing an order is typically done through a customer service representative or over a network using a computing device and a web browser. A service order 102 is generated that includes various types of information. Some of this information originates from the customer, such as desired goods or services, customer name and address, and desired date for performance. Additional information is generated by the company. This type of information is specific to the company and has virtually limitless possibilities, such as service order numbers, action codes, project codes, sequence codes, equipment requirements, issue dates, application dates, completion dates, costs, department codes, assigned telephone numbers, and various remarks for example.

All of this information from the service order 102 can be input into a source database 104. There are various ways in which the data may be entered. According to one aspect of the invention, the service order 102 is an electronic document. The information on the service order 102 is parsed and information associated with specific codes are input into corresponding fields in a source database table such that all of the entries from one order are linked to a common order number. One particular code corresponds to return customers. Each entry input into the source database 104 from a return customer's service order 102 is linked to a return customer code. By doing so, the source database table may be searched for entries linked to the return customer code and all information relating to these service orders may be extracted and placed into smaller database tables. Smaller tables allow for quicker searches when searching for and extracting return customer order information in the process described below. It is to be understood that the source database 104 can be searched for any customer code that was linked to information from the service order, not just the codes related to return customers. For example, if information regarding new customers or customers from a particular category of business is desired rather than information on returning customers, the database 104 would be searched for the specific customer code associated with the desired subset of customers.

In a preferred embodiment, summary information 106 from the service orders 102 is extracted from the source database table and placed in a smaller table. For purposes of illustration, this table will be referred to as a Winback Table 108. The Winback Table 108 includes information such as the order number, completion date, issue date, application date, due date, sales codes, routing codes, project number, and other information such that each row of the table corresponds to a different order. Specific, detailed information 110 contained within each service order 102 is extracted from the source database 104 table and placed in a second smaller table. For purposes of this discussion, this table will be referred to as a Selected Elements Table 112. The Selected Elements Table 112 may contain many rows of information for each order, with each piece of information associated with the order number from the originating service order. The information may include, but is not limited to, action codes identifying inward, outward, and recapped action coding for services, features, and equipment; text strings indicating the range of telephone numbers ordered; and universal service order codes and other codes specifying and representing services, features, and equipment details. A Selected Elements Table may comprise many rows of information corresponding to each order number.

It is to be understood that the order information pertaining to return customers may remain in the source database 104 with all customer orders, or may be extracted into a single table or any number of tables. By storing the information corresponding to the orders from return customers in two separate tables 108 and 112 in the manner described above, the tables 108 and 112 are much smaller than the large table in the source database 104 containing order information from all customers, resulting in quicker search times and a more manageable format for analyzing data. The Winback Table 108 only includes one row per order, with each row containing essential order information. A user must only count the number of rows with completed dates for a given time period to determine the number of orders from return customers over that same time period. This calculation may be programmed into a database management program such as ACCESS by Microsoft Corporation of Redmond, Wash. to run automatically on a given date and time, or when queried.

The database management program is part of a larger database management system 124 shown in FIG. 1 as being associated with local database 116. The dotted line in FIG. 1 encompasses the functions 126 performed by database management system 124. Database management system 124 comprises a processor, memory, a database management program such as ACCESS discussed above, and stored logic executed by the database management program, the logic being programmed to execute the functions 126 outlined by the dotted line in FIG. 1 and described in FIGS. 2 and 3. Database management system 124 may also comprise user input and output devices such as a keyboard, mouse, display, and printer for accepting instructions from a user and presenting results to the user. It should be noted that database management system 124 may comprise more than one database management program to perform any combination of the functions encompassed within the dotted line of FIG. 1. Additionally, it should be noted that database management system 124 is shown FIG. 1 as being associated with local database 116 since system 124 extracts specific information from source database 104 to local database 116 and performs various operations on the extracted information. However, database management system 124 may alternatively be shown as being associated with source database 104 since all of the described functions 126 may occur without extracting information to a local database 116, as will be discussed below.

Referring back to FIG. 1 and using a telecommunications company as an example, a user may utilize database management system 124 to query the database 104 for all telephone line orders completed in the month of November. The database management system would search the Winback Table 108 for orders with completion dates in November, count those orders, and return the sum to the user. Although it may be helpful to the user to know the number of completed orders for a given month or other time period, this total still does not reflect the actual number of telephone lines ordered since a single order could be for one telephone line or for 2000 telephone lines. This number will, however, be used as a target number for reconciliation with a Completions Table 118 when scrubbing the Completions Table 118 of any erroneous entries and extraneous information introduced when linking the order information from the Winback Table 108 and Selected Elements Table 112, as discussed below.

A primary goal is to determine the quantity of goods or services, telephone lines in our example, ordered by customers returning to the company. This quantity can be determined from information 114 extracted from the Selected Elements Table 112. The information 114 within the Selected Elements Table 112 and the Winback Table 108 for a desired period of time is extracted, linked, and stored in a local database 116 as the Completions Table 118. It is to be understood that local database 116 and source database 104 may be the same database. However, in a preferred embodiment source database 104 is a regional database that stores information for all locations or multiple locations of a company while local database 116 is a database located at a geographically separate location from the source database and stores only information extracted from the source database that is specific to the separate geographic location associated with the local database.

The Completions Table 118 provides complete order information 114 for a requested period of time. It is built by extracting information 114 from the Selected Elements Table 112 and matching it to the summary information 106 in the Winback Table 108 based on order numbers and issue dates. Although order numbers are re-used, it is not likely to have two orders issue on the same day with the same order number and issue date. Using order numbers, information for each order completed within a selected time period can be extracted from the two tables 108 and 112 and stored in the Completions Table 118. Therefore, the Completions Table 118 comprises multiple rows for each order completed within the selected time period.

Using the telecommunications company example, each row of the Completions Table 118 includes, among other things, an action code and a field identifier (FID). The action code pertains to whether the order is an incoming order from a customer while the FID describes represents a specific service, feature, or equipment details and may be followed by a text string. The FID "TN" indicates that a text string will follow in the adjacent field that identifies a range of telephone numbers. It is to be understood that embodiments of the present invention are not limited to searching for FIDs and action codes. The search is conducted to identify the telephone numbers ordered. In the preferred embodiment, these numbers are represented by a text string that follows an identifying code or FID. The search criteria may be any other code, identifier, or even the telephone numbers themselves. However, searching for telephone numbers could result in existing telephone numbers that are stored with the orders to be misconstrued as ordered telephone numbers. For this reason, it is desirable to associate ordered telephone numbers with an identifying code. By adding the number of telephone numbers in the range, as well as all of the others in any additional ranges following the other identical FIDs, a total number of telephone lines ordered by returning customers for the selected period of time can be determined.

However, simply adding the telephone numbers from the ranges provided in the Completions Table 118 will not necessarily result in an accurate count of the total telephone lines ordered by return customers for the requested time period. As previously mentioned, orders originally entered into the source database 104 and ultimately extracted into the Completions Table 118 might have been cancelled but not removed from the database or even mistakenly duplicated within the source database 104 due to issue dates and application dates that do not match. Because order numbers are re-used, the same order with a large variation between issue and application dates could be seen as different orders and co-exist within the database 104. There are many other reasons as to why the completed orders in the Completions Table 118 might not match the completed order total from the Winback Table 108 including but not limited to order cancel and re-issue situations, differences in application dates, and sales code or lead telephone number changes after the order was taken. Therefore, the numbers must be reconciled prior to achieving an accurate count for the total telephone lines from the completed orders. To reconcile the number of completed orders in the Completions Table 118 and the Winback Table 108, logic is programmed into the database management system that preferably executes three separate cycles of extraction at reconciliation process 120. This reconciliation process 120 is discussed in detail below with respect to FIG. 3. The results of this reconciliation process 120 are stored in Results Table 122 where the total number of telephone numbers associated with the orders for the selected time period is determined.

Figure 2:
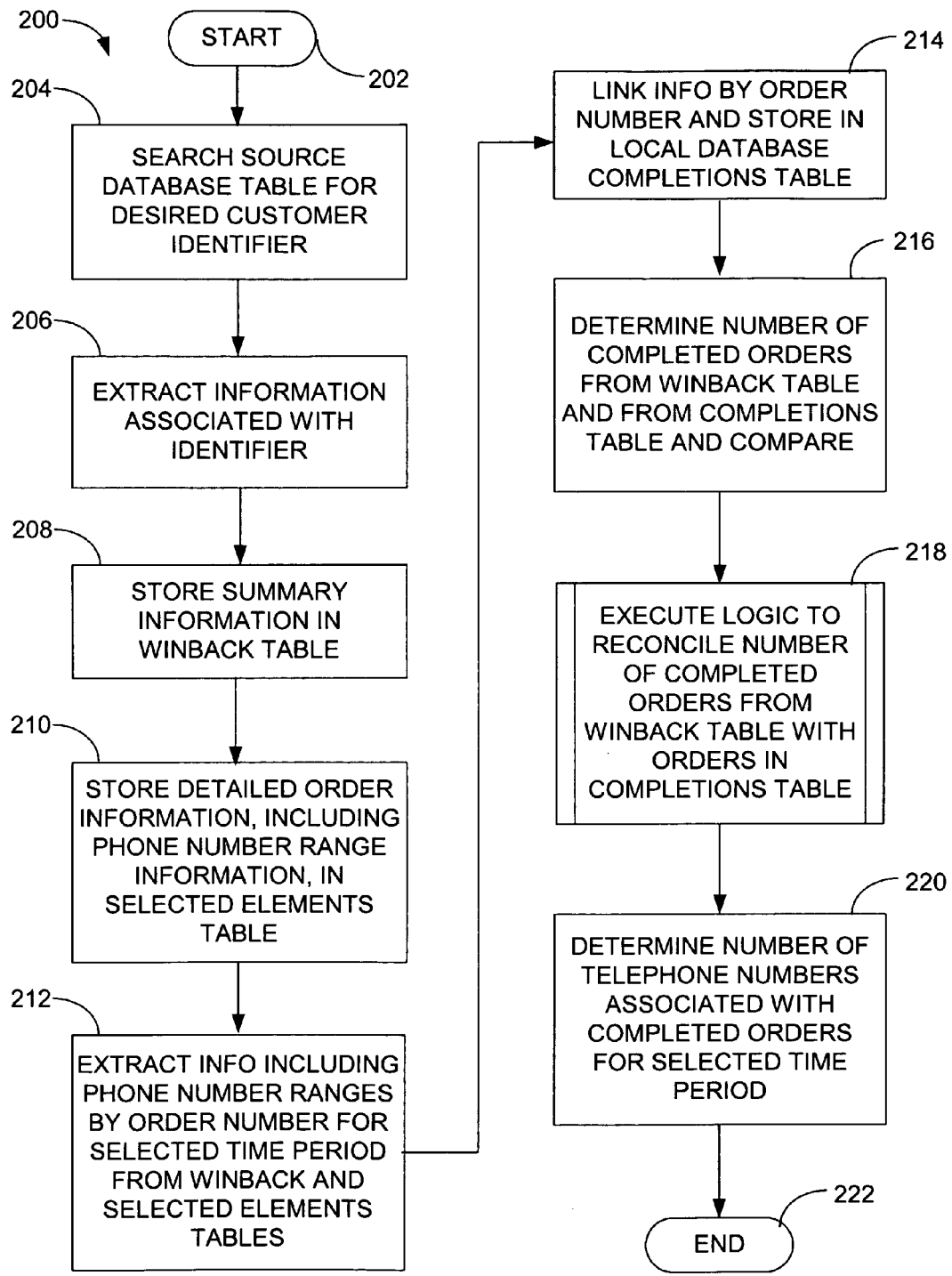
FIG. 2 illustrates the logical operations for determining the number of telephone numbers associated with completed orders of a subset of customers according to one embodiment of the present invention.

FIG. 2 shows a process flow 200 for determining the number of telephone numbers ordered during a specific period of time by a selected subset of customers, the subset in this example being returning customers. The process begins at block 202 and progresses to block 204. At block 204, the source database 104 that contains all of the order information from all customer orders over a relatively large period of time is searched for the return customer identifiers discussed above. All order information for a selected period of time that is linked to a return customer identifier is extracted from the source database at block 206. The summary information 106, including essential order and due dates, is stored in Winback Table 108 at block 208. The detailed order information 110, including text strings associated with the ranges of telephone numbers ordered, is stored in the Selected Elements Table 112 in block 210. In block 212, information 114 such as the order numbers, telephone number range information, application dates, issue dates, and completion dates, is extracted from the Winback and Selected Elements Tables 108 and 112, respectively. The information 114 is linked by order number at block 214 and stored in the Completions Table 118 within local database 116. At block 216, the number of completed orders for the selected time period is determined from Winback Table 108 and compared to the number of orders stored in Completions Table 118. Block 218 depicts the reconciliation process 120, which is discussed below with respect to FIG. 3. Finally, the number of telephone numbers ordered during the selected time period by return customers is determined at block 220. This determination is explained below with reference to FIG. 4. The process ends at block 222.

Figure 3:
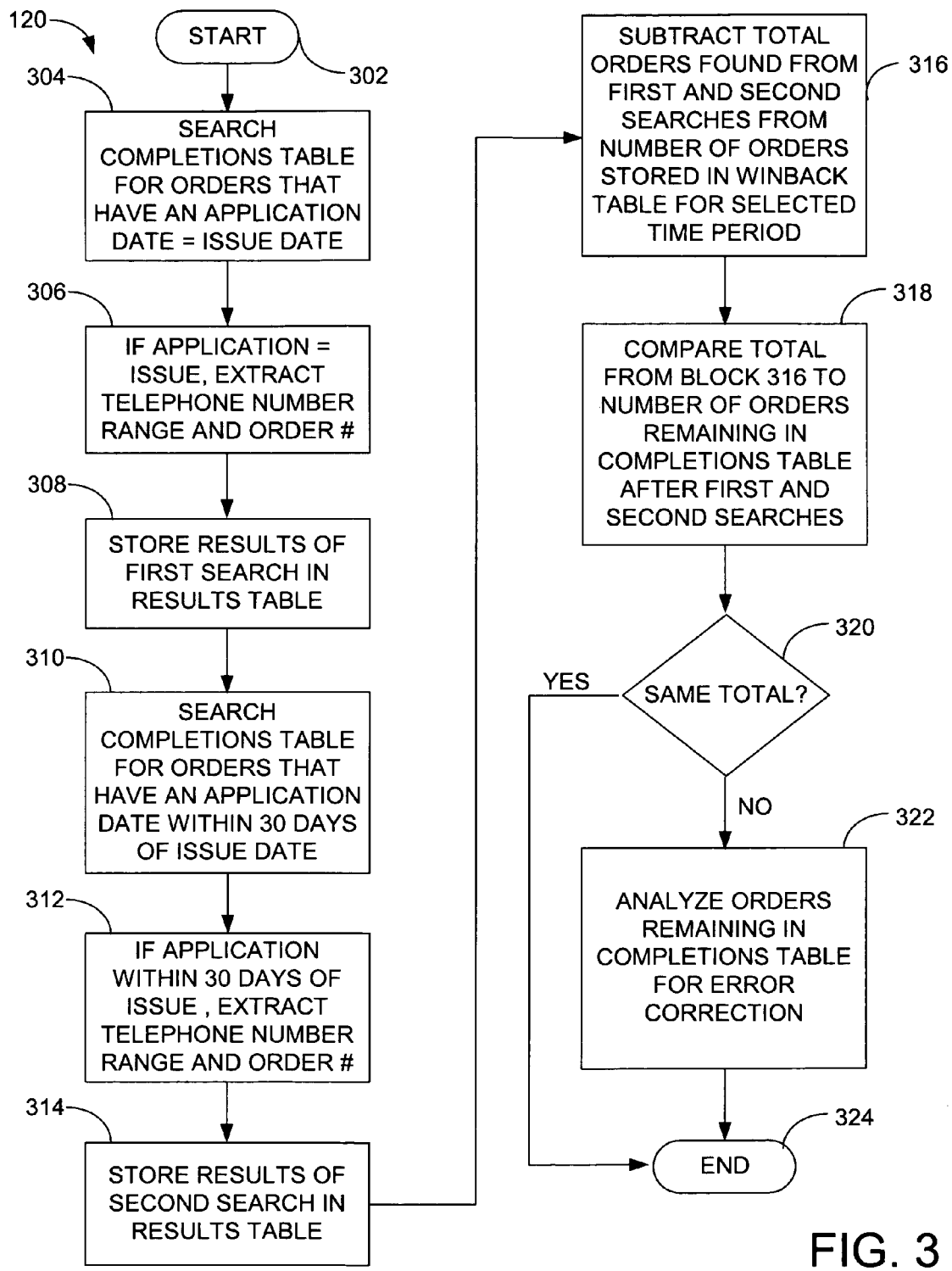
FIG. 3 illustrates the logical operations for reconciling the number of completed orders from a Completions Table with those of a Winback Table according to one embodiment of the present invention.

FIG. 3 depicts the reconciliation process 120. The first cycle begins at block 302 and proceeds to block 304 where the Completions Table 118 is searched for order entries in which the issue date is an exact match to the application date. The issue date is the date that the order is received into a service order control system used to translate a customer's order into a service order that comprises all of the necessary information for processing. The application date is the date on which the customer applied for a service or requested a change in existing service. It is highly unlikely that two different orders could issue on the same day under the same order number. In addition to the issue and application dates matching, the first cycle searches for the text string adjacent to any "TN" FIDs, which identify the text string as a telephone number or range of telephone numbers associated with the order. It is to be understood that any number and type of search criteria may be appropriate for this cycle depending on the types of entries made into the source database 104, as well as any additional classifications placed on data when extracted into the Winback Table 108 and Selected Elements Table 112. The important search criteria for this cycle is that the issue and application dates match, and for these entries, the text strings associated with the ordered telephone numbers and number ranges are extracted at block 306 and stored in the Results Table 122 at block 308.

After executing the first cycle, a majority of the number of completed orders determined from the Winback Table 108 for the requested period of time will likely be found and information regarding the number of telephone lines ordered will be placed in the Results Table 122. For example, assume that for the month of November, the Winback Table 108 shows that 10,000 orders are completed. After the first cycle is executed, assumed that 9000 orders have application and issue dates that match. The information from these 9000 orders is found in the Completions Table 118 and an accurate count of ordered telephone lines from these orders can be determined using the logic described above. However, the Completions Table 118 still comprises order information originally from the Selected Elements Table 112 that ideally adds up to the 1000 orders that when added to the 9000 orders found in the first cycle will result in the 10,000 orders calculated from the Winback Table 108. It is likely that the remaining orders do not precisely add up to 1000 due to the inherent problems discussed above with such a large number of orders and complex processing procedures that often leads to duplicate orders and missing information. In order to reconcile the numbers as closely as possible, a second cycle is executed next.

In the second cycle that begins at block 310 of FIG. 3, a search of the remaining orders in the Completions Table 118, i.e. the orders that do not have identical application and issue dates, is conducted to extract all order information for orders with application and issue dates that are within 30 days of each other and that contain a FID of "TN." It is to be understood that the precise search criteria for each cycle may vary depending on the type of business utilizing embodiments of the present invention. For a telecommunications company, the search criteria described here may result in the most accurate reconciliation of orders, while another type of business may utilize additional codes and information within the various tables that if used for searching, would lead to more accurate or informative results. Additionally, it is to be understood that these cycles can be programmed to run concurrently or sequentially. For example, logic can be used to search a table of order information for all orders with application and issue dates that are identical and for those within a determined number of days of each other as a single step rather than as two separate cycles.

However, the preferred method is to separate the searches and execute them sequentially as described above so that a better understanding of the month's orders can be obtained. It may be beneficial to know how many orders had matching application and issue dates prior to identifying those with dates within 30 days of each other. If a relatively low number of orders resulted from the first cycle, it could be an indicator that there is an error in the system that requires correction. Catching the error at this point within the process would be beneficial rather than waiting until all cycles are completed since it would result in less time spent on the task and would prevent unnecessarily tying up resources by running cycles that would need to be re-run after the error is found and corrected.

Additionally, the database management system can present the results after all cycles have completed, or after each cycle has completed before the next cycle begins. As an example, the logic may be programmed to execute the cycles sequentially and to present the results for each cycle separately, but only after completing the entire process of reconciling the order numbers from the Winback Table 108 with the number of orders from the Completions Table 118 and then counting the number of telephone lines within each order. By executing each cycle independently and reviewing the results prior to executing the next cycle, more control is retained over the process so that any necessary adjustments, such as a change in search criteria or error correction, may take place as soon as possible to maximize the efficiency of the entire process.

Returning to FIG. 3 and the process of reconciling the order numbers from the Winback Table 108 and Completions Table 118, the second cycle will result in additional orders for which the application and issue dates are within 30 days of each other. These orders are extracted at block 312 and stored in Results Table 122 at block 314. Row 4 of the orders in Results Table 122 shown in FIG. 4 represents the results of the second cycle in our example. If an application date and issue date are relatively close, 30 days in our example, it can be assumed with a relatively high degree of accuracy that the order is a valid one as opposed to a duplicate or error. This assumption is based on the reality that most changes to the order that would effect the application and issue dates occur within 30 days of the order being placed. As discussed, with other businesses or other situations, other search criteria may be used to extract those orders that have a high degree of certainty to be valid.

In block 316, the total number of orders found from the first and second searches is subtracted from the total number of orders for the selected time period determined from the Winback Table 108 as discussed previously. A relatively low number of orders should remain at this stage in the process. In block 318, the result is compared to the number of orders remaining in the Completions Table 118 after completing the first and second searches. A determination is made at block 320 as to whether the totals were the same. If so, the orders have been reconciled and the process ends at block 324. If not, then the remaining orders in the Completions Table 118 must be analyzed for errors and discrepancies at block 322. The process ends at block 324. Analyzing the remaining orders may be done manually or through programmed logic for the reasons why the application and issue dates differ by more than 30 days. There may be additional search criteria applicable to the particular business that would indicate reliable order information and further capture additional orders. By executing the first two cycles prior to manually analyzing any order content, the number of orders which must be verified manually is greatly minimized and the number of telephone lines ordered during the selected period of time can be determined with a high degree of accuracy in a short period of time.

FIG. 4 shows an example of a simplified Results Table 122. Results Table 122 includes column 402 where the various order numbers for the selected period can be found, column 404 where the application dates corresponding to the order numbers are found, column 406 where the corresponding issue dates are located, column 408 for FIDs, column 410 where the telephone ranges corresponding to the order number may be found, columns 412, 414, 416, and 418 where extensions 1, 2, 3, and 4 respectively may be found, and column 420 where the total number of telephone lines ordered for each row may be found. It should be noted that the fourth row of orders shown in FIG. 4 represents the results of the second cycle. As can be seen, the application date and issue date are not exact, but are within 30 days of each other. Only one order is shown in FIG. 4 from cycle two for simplicity, but the number of "hits" may be much larger. The last row of Results Table 122 sums the number of telephone lines from each row to arrive at a total number of telephone lines ordered during the selected time period, for which the application dates and issue dates are the same or within 30 days of each other. As described below, additional lines may be counted manually for orders deemed to be correct after analyzing those orders that do not have application and issue dates within 30 days of each other.

One method of obtaining a telephone number count from the text strings is to convert the telephone range from the text string into two numbers representing the last four digits of the two telephone numbers that define the outer limits of the sequential telephone number range and then calculate the difference between those two numbers. For example, looking at the first row of the Results Table 122 illustrated in FIG. 4, the text string following the FID "TN" is 404-123-6000-6500. This represents an order for telephone number 404-123-6000 and every sequential number up to and including telephone number 404-123-6500. To determine the number of telephone lines in this order, logic is programmed into the database management system that captures the second four-digit extension, 6500, from the last telephone number of the range and enters that number as Extension 1. Similarly, the first four-digit extension, 6000, from the first telephone number of the range is entered as Extension 2. In doing so, the logic captures character positions 14-17 and 9-12 as Extensions 1 and 2 respectively. The programmed logic then subtracts the Extension 2 value from the Extension 1 value and adds 1 since subtracting one number from the other does not account for both numbers being included in the result. The result is the total number of telephone lines ordered in that row, which is 501 in our example.

At times, more than one range may be present within a text string as seen in the second row of the Results Table 122 shown in FIG. 4. This can happen when certain telephone numbers within an order are skipped for any number of reasons. In such a situation, the text string may be entered such that the range of numbers is followed by a comma and a second range of four-digit extensions. The first and second numbers from the second range of four-digit extensions are extracted and entered into the Extension 4 and Extension 3 fields, respectively, in a similar manner as described for Extensions 1 and 2. The total number of telephone numbers ordered from this row is determined by calculating the differences between Extensions 1 and 2 and between Extensions 3 and 4, adding those two differences together, and adding two. In our example from row 2 of FIG. 4, (7000–6501)+(7500–7002)+2=999 telephone numbers. Note that the same counting techniques described here may be employed to count the telephone numbers found as a result of the first search, the second search, or those found as a result of manually analyzing those orders left over after the completion of the first and second searches.

It is to be understood that while the examples described above refer to ten-digit telephone numbers, the present invention is equally applicable to any calling identifier of any communication device now known or developed in the future. For example, the invention described above could be used to count the number of IP addresses ordered for Voice-Over-IP communications. A single, unique numerical IP address would count once, while the last digits of a sequential range of IP addresses following a FID used to identify IP addresses in the Completions Table could be extracted as extensions and subtracted to determine the number of IP addresses ordered in that particular line of the Completions Table. After determining the total number of IP addresses ordered in each line of the Completions Table, the totals are added together to arrive at a total number of IP addresses ordered during the selected time period.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for generating service order count metrics, comprising:

searching a first table for an indicator identifying a selected subset of customer order information;

in response to locating the indicator, extracting information associated with the selected subset;

storing the extracted customer order information in a second table, wherein the customer order information comprises a range of communication device identifiers;

searching the second table for the range of communication device identifiers;

determining the number of communication device identifiers from the range of communication device identifiers;

generating a first, second, third, and fourth extensions, wherein generating the first and second extensions comprises:

extracting characters 14-17 of the range and storing the 4-digit number as the first extension, extracting characters 9-12 of the range and storing the 4-digit number as the second extension, and subtracting the second extension from the first extension and adding one to the result to arrive at a total number of communication device identifiers for the range;

determining the numerical difference between a third and a fourth extension and adding one to the result;

adding the result from the third and fourth extensions to the result obtained from the first and second extensions to arrive at a total number of communication device identifiers for the range of communication device identifiers; and generating the service order count metrics, wherein the service order count metrics includes the total number of communication device identifiers.

2. The method of claim 1, wherein the second table comprises a summary table and a separate detail table.

3. The method of the claim 2, wherein the summary table comprises one row per each order number for a total number of orders, each row containing an order completion date, and wherein the detail table comprises a plurality of rows per order such that at least one row per order number contains the range of communication device identifiers.

4. The method of claim 2, further comprising:

extracting the range and associated order number and storing the range and order number in a third table;

determining a number of customer order numbers for a selected period of time from the summary table;

determining the number of customer order numbers for the selected period of time from the third table; and when the number of customer orders for the selected period of time from the third table is not equal to the number of customer orders from the summary table, reconciling the difference.

5. The method of claim 4, wherein reconciling the difference comprises:

conducting a first search of the third table for order numbers that have an associated application date that matches an associated issue date;

extracting the order number and the range of communication device identifiers associated with the orders found in the first search and storing the order number and range in a fourth table;

conducting a second search of the remaining orders of the third table for orders where the application date is within a selected period of time of the issue date;

extracting an order number and the range of communication device identifiers associated with the orders found in the second search and storing the order number and range in the fourth table; and analyzing the orders remaining after the first and second searches for errors.

6. The method of claim 4, wherein the first and second tables are in a first database and the third table is in a second database.

7. The method of claim 1, further comprising:

determining when third and fourth 4-character numerals exist within the range;

when third and fourth 4-character numerals do exist, extracting the third and fourth 4-character numerals and storing them as the third and fourth 4-digit extensions, respectively.

8. The method of claim 1, further comprising:

receiving a service order;

parsing the service order for segments of information corresponding to data fields of the first table; and storing the information segments in the corresponding data fields of the first table.

9. A computer-readable medium having stored thereon computer-executable instructions which, when executed by a computer, cause the computer to:

search a first table for an indicator identifying a selected subset of customer order information;

in response to locating the indicator, extract the information associated with the selected subset;

store the extracted customer order information in a second table, wherein the order information comprises a range of communication device identifiers;

search the second table for the range;

generate a first, second, third, and fourth extension, wherein generating the first and second extensions comprises:

extracting characters 14-17 of the range and storing the 4-digit number as the first extension, extracting characters 9-12 of the range and storing the 4-digit number as the second extension, and subtracting the second extension from the first extension and adding one to the result to arrive at a total number of communication device identifiers for the range;

determine the numerical difference between a third and a fourth extension and add one to the result;

add the result from the third and fourth extensions to the result obtained from the first and second extensions to arrive at a total number of communication device identifiers for the range;

determine the number of communication device identifiers from the range; and generate a service order count metric, wherein the service order count metric includes the total number of communication device identifiers.

10. The computer-readable medium of claim 9, wherein the second table comprises a summary table and a separate detail table.

11. The computer-readable medium of the claim 10, wherein the summary table comprises one row per each order number for a total number of orders, each row containing an order completion date, and wherein the detail table comprises a plurality of rows per order such that at least one row per order number contains the range of communication device identifiers.

12. The computer-readable medium of claim 10, further comprising computer-executable instructions stored thereon which, when executed by a computer, cause the computer to:

extract the range and associated order number and storing the range and order number in a third table;

determine a number of customer order numbers for a selected period of time from the summary table;

determine the number of customer order numbers for the selected period of time from the third table; and when the number of customer orders for the selected period of time from the third table is not equal to the number of customer orders from the summary table, reconcile the difference.

13. The computer-readable medium of claim 12, wherein reconciling the difference comprises executing computer-executable instructions that cause the computer to:

conduct a first search of the third table for order numbers that have an associated application date that matches an associated issue date;

extract the order number and the range of communication device identifiers associated with the orders found in the first search and storing the order number and range in a fourth table;

conduct a second search of the remaining orders of the third table for orders where the application date is within a selected period of time of the issue date;

extract an order number and the range of communication device identifiers associated with the orders found in the second search and storing the order number and range in the fourth table;

subtract the total number of orders found in the first and second searches from the total number of customer order numbers from the summary table for the selected period of time to determine the number of orders that should be remaining in the third table after the first and second searches and compare this number to the actual orders remaining; and analyze the orders remaining after the first and second searches for errors.

14. The computer-readable medium of claim 12, wherein the first and second tables are in a first database and the third table is in a second database.

15. The computer-readable medium of claim 9, further comprising computer-executable instructions stored thereon which, when executed by a computer, cause the computer to:

determine when third and fourth 4-character numerals exist within the range;

when third and fourth 4-character numerals do exist, extract the third and fourth 4-character numerals and store them as third and fourth 4-digit extensions, respectively.

16. The computer-readable medium of claim 9 further comprising computer-executable instructions stored thereon which, when executed by a computer, cause the computer to:
receive a service order;
parse the service order for fragments of information corresponding to data fields of the first table; and
store the information fragments in the corresponding data fields of the first table.

17. A system for generating service order count metrics, comprising:
means for searching a first table for an indicator identifying a selected subset of customer order information;
in response to locating the indicator, means for extracting the information associated with the selected subset;
means for storing the extracted customer order information in a second table, wherein the order information comprises a range of communication device identifiers;
means for searching the second table for the range;
means for determining the number of communication device identifiers from the range wherein means for determining the number of communication device identifiers comprises:
means for generating a first, second, third, and fourth extensions, wherein generating the first and second extensions comprises:
means for extracting characters 14-17 of the range and storing the 4-digit number as the first extension,
means for extracting characters 9-12 of the range and storing the 4-digit number as the second extension, and
means for subtracting the second extension from the first extension and adding one to the result to arrive at a total number of communication device identifiers for the range;
means for determining the numerical difference between a third and a fourth extension and adding one to the result;
means for adding the result from the third and fourth extensions to the result obtained from the first and second extensions to arrive at a total number of communication device identifiers for the range; and
means for presenting the results of the determination to a user.

18. The system of claim 17, wherein the second table comprises a summary table and a separate detail table, and wherein the system further comprises:
means for extracting the range and associated order number and for storing the range and order number in a third table;
means for determining a number of customer order numbers for a selected period of time from the summary table;
means for conducting a first search of the third table for order numbers that have an associated application date that matches an associated issue date;
means for extracting the order number and the range of communication device identifiers associated with the orders found in the first search and for storing the order number and range in a fourth table;
means for conducting a second search of the remaining orders of the third table for orders where the application date is within a selected period of time of the issue date; means for extracting an order number and the range of communication device identifiers associated with the orders found in the second search and for storing the order number and range in the fourth table;
means for subtracting the total number of orders found in the first and second searches from the total number of customer order numbers from the summary table for the selected period of time and compare this number to the actual orders remaining in order to determine the number of orders that should be remaining in the third table after the first and second searches; and
means for analyzing the orders remaining in the third table after the first and second searches for errors if the comparison does not result in the same amount of remaining orders.

* * * * *